Patented Dec. 22, 1931

1,837,286

UNITED STATES PATENT OFFICE

RUDOLPH SIMON OPPENHEIM, OF HOLLYWOOD, CALIFORNIA

OZONE PROCESS OF OBTAINING METALS FROM ORES

No Drawing. Application filed September 27, 1926. Serial No. 138,126.

This invention relates to the process of obtaining metals from their ores, and it has for one of its objects the provision of a process which is more economical, both in money and time, than previous processes. Other objects will be appreciated by those skilled in the art.

I will illustrate specifically my invention, but it is to be understood that the latter is limited only by the appended claim.

For example, it will be assumed that an ore containing copper sulphide and ferrous sulphide is to be employed. This ore is milled or otherwise finely comminuted. Subsequent to the process of finely dividing the ore, it is roasted. The roasting may be done in any suitable manner, such, for example, as by a rotary roasting machine.

The copper sulphide and ferrous sulphide in the ore have been converted by the roasting process, at least in large part, say into copper sulphate and iron sulphate. This copper sulphate and iron sulphate are then dissolved by placing the mass of ore in water, or pouring the water over the ore. The water dissolves the copper sulphate and iron sulphate and this aqueous solution of copper sulphate and iron sulphate is then preferably but not necessarily separated from the undissolved portion of the ore, which are termed the tailings.

The aqueous solution of copper and iron sulphate is then passed over finely divided iron, which may be in the form of sponge iron; the result of this step is to precipitate the copper from the solution, in metallic form, on the iron.

The resulting ferrous sulphate is then changed to ferric sulphate by mixing ozone therewith. However, the ozone may be added to the mixture of tailings and copper and iron sulphate before performing the step recited in the previous paragraph, in which case the mentioned step need not be performed.

The ferric sulphate produced by oxidation of the ferrous sulphate through the agency of the ozone, is then passed over and through the tailings, with the result that the heretofore insoluble copper and iron salts are dissolved. The copper which is thus recovered in solution may be precipitated out of the same by bringing into contact therewith iron in finely divided state.

The method of converting metallous sulphate into metallic sulphate by means of ozone as herein above described, effects a saving of seventy-five percent (75%) of the time formerly necessary to accomplish the mentioned transformation. Moreover, the metallic sulphate resulting from treatment of metallous sulphate with ozone is only very weakly acid in reaction, whereas the metallic sulphate produced by raw compressed air results in creating in the solution a considerable quantity of sulphuric acid; this sulphuric acid is undesirable, in fact, very much so, since it eats up the metal of the apparatus employed in handling the ferric sulphate.

It will thus be readily appreciated that my method of changing metallous sulphate into metallic sulphate is very much more economical in time and money than is any previous process. The ferric sulphate resulting from my novel process will not damage machinery, pipes, fittings, etc., since it contains insufficient acid to do so; therefore, acid proof apparatus, which is more expensive than ordinary apparatus, need not be employed. The amount of money tied up in the apparatus used to carry out my process is much less than when other processes are employed.

While ferric sulphate leaching processes must buy ferrous sulphate and convert it by the aid of nascent oxygen and other chemicals, by heat and under pressure, in my invention only ozone or ozonized air is used without pressure and at ordinary temperature.

While I have described one embodiment of my invention, modifications thereof may be readily devised without departing from the spirit of my invention, and it is to be understood that such modifications come within the scope of the appended claim.

I claim:

The process which consists of comminuting metalliferous ores, roasting the same to convert the sulphides therein to sulphates, and subjecting the latter to the action of ozone in the presence of water, whereby the salts therein are converted from a metallous state to a metallic state.

RUDOLPH SIMON OPPENHEIM.